(12) United States Patent
Endo et al.

(10) Patent No.: US 8,567,264 B2
(45) Date of Patent: Oct. 29, 2013

(54) VEHICLE SEAT AND PASSENGER'S WEIGHT MEASUREMENT DEVICE FOR VEHICLE SEAT

(71) Applicants: TS Tech Co., Ltd., Asaka (JP); Honda Motor Co., Ltd., Tokyo (JP)

(72) Inventors: Shigeru Endo, Shioya-gun (JP); Kenji Sato, Shioya-gun (JP); Harutomi Nishide, Wako (JP); Tatsuya Yamazaki, Wako (JP)

(73) Assignees: TS TECH Co., Ltd., Asaka (JP); Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/683,770

(22) Filed: Nov. 21, 2012

(65) Prior Publication Data

US 2013/0076088 A1    Mar. 28, 2013

Related U.S. Application Data

(63) Continuation of application No. 13/105,483, filed on May 11, 2011, now Pat. No. 8,342,038, which is a continuation of application No. 13/033,242, filed on Feb. 23, 2011, and a continuation of application No. 12/840,103, filed on Jul. 20, 2010, now Pat. No. 7,913,578, and a continuation of application No. 11/632,715, filed as application No. PCT/JP2005/013944 on Jul. 29, 2005, now Pat. No. 7,793,557.

(30) Foreign Application Priority Data

Jul. 30, 2004  (JP) ................................. 2004-223432
Jul. 30, 2004  (JP) ................................. 2004-223447

(51) Int. Cl.
  *G01L 1/00* (2006.01)
(52) U.S. Cl.
  USPC ...................................... 73/862.381; 73/760

(58) Field of Classification Search
  USPC ............................. 73/760, 862.381, 862.391, 73/862.041–862.046
  See application file for complete search history.

(56) References Cited

U.S. PATENT DOCUMENTS

| | | |
|---|---|---|
| 5,600,104 A | 2/1997 | McCauley et al. |
| 5,991,676 A | 11/1999 | Podoloff et al. |

(Continued)

FOREIGN PATENT DOCUMENTS

| | | |
|---|---|---|
| DE | 1 020 320 | 12/1957 |
| DE | 103 15 400 A1 | 10/2004 |

(Continued)

OTHER PUBLICATIONS

Notice of Allowance in U.S. Appl. No. 12/840,103 mailed Nov. 23, 2010.

(Continued)

*Primary Examiner* — Max Noori
(74) *Attorney, Agent, or Firm* — Oliff & Berridge, PLC

(57) ABSTRACT

The submarine phenomenon can be prevented and the accuracy of a passenger's weight measurement is improved. A vehicle seat includes a pair of fixed lower rails fixed on the floor of a passenger compartment, a pair of movable upper rails that are engaged with the fixed lower rails so as to be slidable in a front-and-rear direction with respect to each of the fixed lower rails, a sub frame which is disposed at an upper side of the movable upper rails, load sensors and that lie between the sub frame and the movable upper rails, brackets and which are disposed so as to erect them on each of the movable upper rails, and a submarine pipe 11 which is crossed between the brackets. The submarine pipe is disposed to be slidable in a left-and-right direction with respect to the right bracket.

30 Claims, 7 Drawing Sheets

(56) References Cited

U.S. PATENT DOCUMENTS

| | | |
|---|---|---|
| 6,356,200 B1 | 3/2002 | Hamada et al. |
| 6,400,259 B1 * | 6/2002 | Bourcart et al. ........... 340/425.5 |
| 6,555,765 B2 | 4/2003 | Paine |
| 6,677,539 B2 | 1/2004 | Miura et al. |
| 6,682,146 B2 | 1/2004 | Minai |
| 6,774,625 B2 | 8/2004 | Suzuki et al. |
| 6,786,104 B1 | 9/2004 | Aoki |
| 6,810,984 B2 | 11/2004 | Sakai et al. |
| 7,137,665 B2 | 11/2006 | Osawa et al. |
| 7,189,931 B2 | 3/2007 | Hida et al. |
| 7,322,605 B2 | 1/2008 | Ventura et al. |
| 7,373,846 B2 | 5/2008 | Furukawa et al. |
| 7,384,099 B2 * | 6/2008 | Schleif et al. ................. 297/253 |
| 7,455,343 B2 | 11/2008 | Endo et al. |
| 7,614,680 B2 | 11/2009 | Endo et al. |
| 7,793,557 B2 | 9/2010 | Endo et al. |
| 7,913,578 B2 | 3/2011 | Endo et al. |
| 8,091,675 B2 | 1/2012 | Endo et al. |
| 8,136,620 B2 | 3/2012 | Hwang et al. |
| 8,292,346 B2 | 10/2012 | Endo et al. |
| 8,342,038 B2 | 1/2013 | Endo et al. |
| 8,398,141 B2 * | 3/2013 | Parker et al. ..................... 296/64 |
| 2005/0061643 A1 | 3/2005 | Rainey |
| 2007/0057527 A1 | 3/2007 | Endo et al. |
| 2007/0126277 A1 * | 6/2007 | Musale ......................... 297/464 |
| 2008/0084086 A1 | 4/2008 | Endo et al. |
| 2009/0195044 A1 * | 8/2009 | Wieclawski ............... 297/378.1 |

FOREIGN PATENT DOCUMENTS

| | | |
|---|---|---|
| GB | 2 415 787 A | 1/2006 |
| JP | A-08-164039 | 6/1996 |
| JP | A-09-207638 | 8/1997 |
| JP | A 10-297334 | 11/1998 |
| JP | A 11-304579 | 11/1999 |
| JP | A 2000-203324 | 7/2000 |
| JP | A-2003-011709 | 1/2003 |
| JP | A 2003-104107 | 4/2003 |
| JP | A-2004-268620 | 9/2004 |
| JP | A-2004-306849 | 11/2004 |

OTHER PUBLICATIONS

Office Action in U.S. Appl. No. 11/632,715 mailed Aug. 28, 2009.
Notice of Allowance in U.S. Appl. No. 11/632,715 mailed Jan. 4, 2010.
Notice of Allowance in U.S. Appl. No. 11/632,715 mailed Apr. 20, 2010.
Office Action from European Patent Application No. 10 007 613.2 dated Jun. 14, 2011.
Dec. 15, 2011 Search Report issued in European Application No. 11181454.7.
Nov. 29, 2011 Office Action issued in Japanese Application No. 2007-537702 (with English translation).
Nov. 30, 2011 Office Action issued in Chinese Application No. 201010552150.5 (with English translation).
Jan. 12, 2012 Office Action issued in European Application No. 10007613.2.
May 24, 2012 Second Office Action issued in Chinese Application No. 201010552150.5 with English-language translation.
Aug. 2, 2012 Office Action issued in U.S. Appl. No. 13/137,713.
Feb. 1, 2013 Office Action issued in U.S. Appl. No. 13/033,242.

* cited by examiner

FIG.2
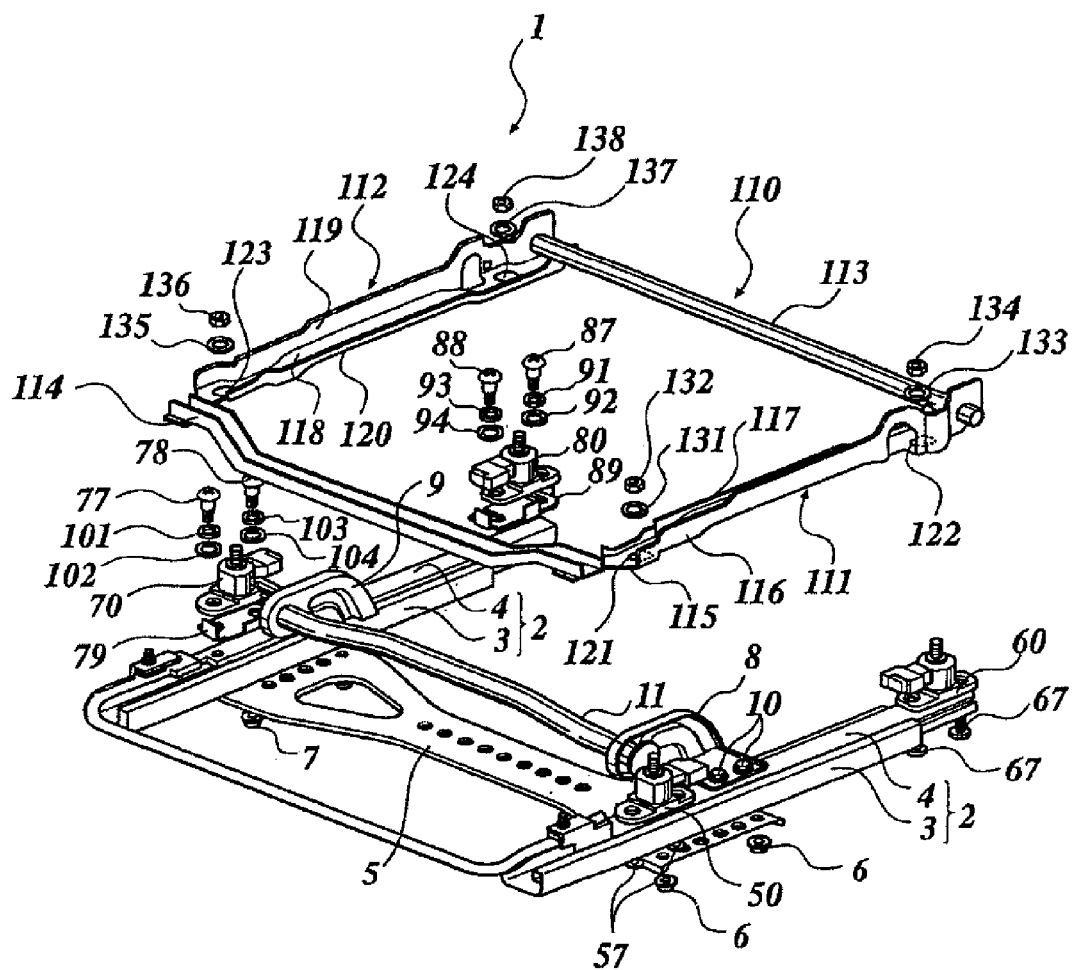
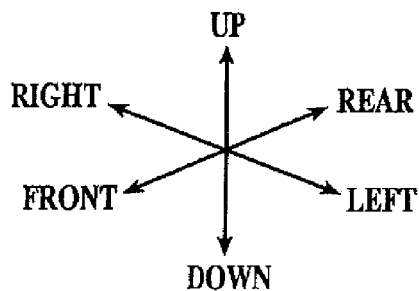

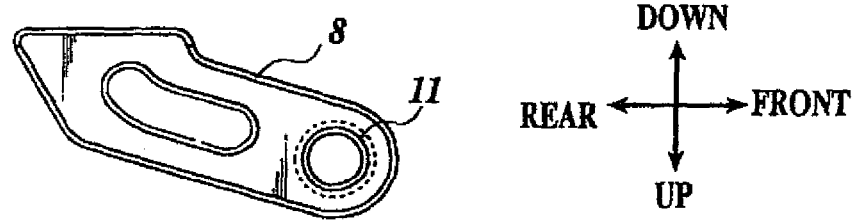
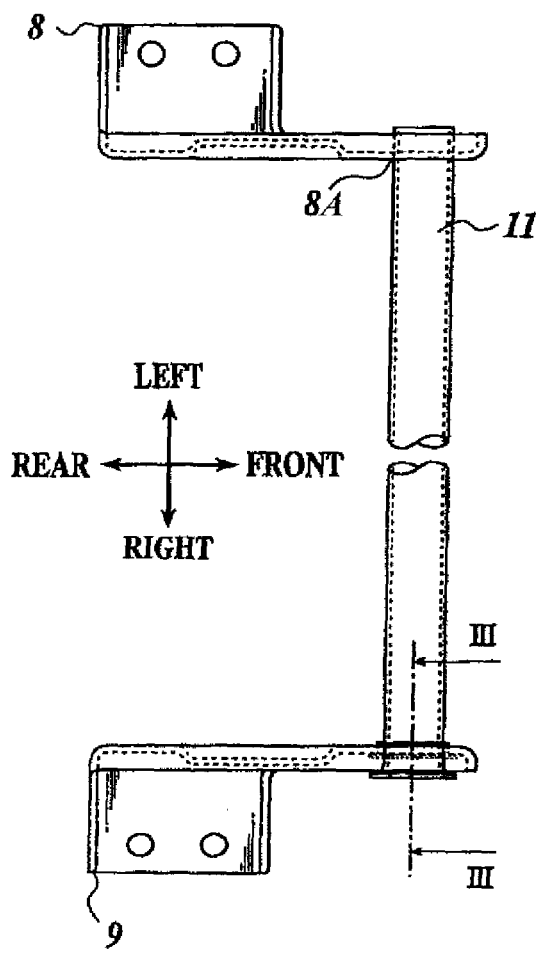
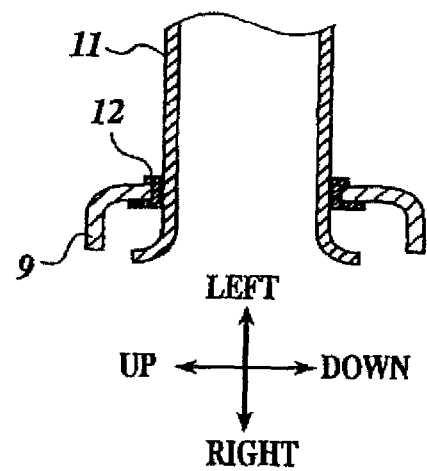

VEHICLE SEAT AND PASSENGER'S WEIGHT MEASUREMENT DEVICE FOR VEHICLE SEAT

This application is a Continuation of U.S. patent application Ser. No. 13/105,483, filed May 11, 2011, which is a Continuation of U.S. patent application Ser. No. 13/033,242, filed Feb. 23, 2011, which is a Continuation of U.S. patent application Ser. No. 12/840,103, filed Jul. 20, 2010, which is a Continuation of U.S. patent application Ser. No. 11/632,715, filed Jan. 18, 2007, which is a U.S. National Stage Application of PCT/JP2005/013944, filed Jul. 29, 2005, which claims priority to Japanese Patent Applications Nos. JP 2004-223447, filed Jul. 30, 2004 and JP 2004-223432, filed Jul. 30, 2004. The disclosure of each of these applications is hereby incorporated by reference in its entirety.

DESCRIPTION

1. Technical Field

The present invention relates to a vehicle seat which measures a weight of a passenger who sits on a vehicle seat and a passenger's weight measurement device of a vehicle seat.

2. Background Art

Recently, to improve performance of various safety devices such as a seat belt and an air bag, operations of the safety devices have been controlled in accordance with a weight of a passenger sitting on a vehicle seat in some cases. In the conventional passenger's weight measurement device for measuring a weight of a seated passenger, a load sensor is disposed between a vehicle floor and the seat cushion (For example, refer to Patent Document 1 and Patent Document 2).
Patent Document 1: Japanese Patent Document 10-297334
Patent Document 2: Japanese Patent Document 11-304579

DISCLOSURE OF THE INVENTION

Problem to be Solved by the Invention

When a forward inertia force by a front collision of a vehicle is applied to a passenger, a so-called submarine phenomenon where the passenger gets under a waist belt occurs. Therefore, by disposing the supporting member to the cushion frame at a position lower than the seating surface of the seat cushion, the submarine phenomenon can be prevented because the buttocks of the passenger are held by the supporting member at the time of front collision of the vehicle. However, in a vehicle seat which a load sensor is disposed, there is an initial risk that the passenger's weight cannot be measured accurately because the inertia force and the like are transmitted to the load sensor through the supporting member and the cushion frame when the buttocks are held by the supporting member.

An object of the present invention is to prevent the submarine phenomenon and to improve the accuracy of passenger's weight measurement.

Means for Solving the Problem

To solve the aforementioned problem, in accordance with the first aspect of the present invention, a vehicle seat comprises a cushion, a load sensor which is disposed under a seating face of the cushion and which measures a weight of a passenger who sits on the cushion, a left mounting unit which is disposed on a left side under the seating face of the cushion, a right mounting unit which is disposed on a right side under the seating face of the cushion, and a bridging member which is provided between the left mounting unit and the right mounting unit and is disposed to at least one mounting unit selected from the left mounting unit and the right mounting unit so as to be slidable in a left-and-right direction with respect to the at least one mounting unit.

As described above, because a bridging member is provided between the left mounting unit and the right mounting unit which are disposed under the seating surface of a cushion, buttocks of a passenger are held by the bridging member at the time of front collision or the like of a vehicle. Therefore, a submarine phenomenon can be prevented.

Further, because the bridging member is provided to be slidable in a left-and-right direction with respect to the at least one mounting unit selected from the left mounting unit and the right mounting unit, the bridging member slides with respect to the at least one mounting unit even when the bridging member is bent by the buttocks of a passenger hitting against the bridging member at the time of front collision or the like of a vehicle. A load such as the left mounting unit and the right mounting unit approaches each other, that is a load in a left-and-right direction, is difficult to be transmitted to the load sensor by having the bridging member slide with respect to the at least one of the mounting unit. Therefore, a fine measurement of a passenger's weight can be obtained even at the time of front collision or the like of a vehicle.

In accordance with the first aspect of the invention, preferably, a mounting hole is formed on the at least one mounting unit to penetrate in the left-and-right direction and the bridging member is inserted into the mounting hole so as to be slidable in the left-and-right direction with respect to the at least one mounting unit.

As described above, because the bridging member is inserted into the mounting hole so as to be slidable in a left-and-right direction with respect to the at least one mounting unit, a load such as the left mounting unit and the right mounting unit approaches each other is difficult to be transmitted to the load sensor.

In accordance with the first aspect of the invention, preferably, a sectional area of the bridging member is larger than an area of the mounting hole at a position apart from the at least one mounting unit towards an end of the bridging member from the mounting hole.

As described above, because a sectional area of the bridging member is larger than an area of the mounting hole, the bridging member does not fall out from the mounting hole even when the bridging member slides with respect to the mounting hole. Therefore, the submarine phenomenon can be prevented reliably.

In accordance with the first aspect of the invention, preferably, the bridging member is a pipe member and an end of the bridging member flares out.

As described above, because the bridging member which is a pipe member is flared at the end, the bridging member does not fall out from the mounting hole even when the bridging member slides with respect to the mounting hole. Therefore, the submarine phenomenon can be prevented reliably.

In accordance with the first aspect of the invention, preferably, the bridging member is fixed to the other mounting unit of the left mounting unit and the right mounting unit, and is slidable in a left-and-right direction with respect to the one mounting unit of the left mounting unit and the right mounting unit.

Further, with respect to the second aspect of the present invention, a passenger's weight measurement device for a vehicle seat comprises a pair of left and right movable rails which are disposed to be movable in a front-and-rear direction on each of a pair of left and right fixed rails fixed on a vehicle side, a cushion frame disposed at an upper side of the pair of movable rails, one load sensor which is disposed between one movable rail of the pair of movable rails and the cushion frame, another load sensor which is disposed between the other movable rail of the pair of movable rails and the cushion frame, and a bridging member which is provided between the pair of movable rails in between a front end of the cushion frame and a rear end of the cushion frame.

As described above, because the bridging member is provided between a pair of the movable rails in between a front end and a rear end of the cushion frame, buttocks of a passenger is held by the bridging member at the time of front collision or the like of a vehicle. Therefore, the submarine phenomenon can be prevented.

Further, because the bridging member is provided separately with respect to a cushion frame disposed on the load sensor, buttocks of a passenger are held by the bridging member at the time of front collision or the like of a vehicle and the inertia force is difficult to be transmitted to the load sensor through the cushion frame even when an inertia force is applied to the bridging member. Therefore, a fine measurement of a passenger's weight can be obtained even at the time of front collision or the like of a vehicle.

Further, the load sensor can be moved in a front-and-rear direction in unity with the movable rails and the cushion frame because the load sensor is arranged in between the movable rails and the cushion frame. Therefore, the load which is transmitted to the load sensor can be always held constant despite of the position in a front-and-rear direction of the vehicle seat.

In accordance with the second aspect of the invention, preferably, the one load sensor is fixed to the one movable rail and the another load sensor is disposed to be movable in a left-and-right direction with respect to the other movable rail.

As described above, because the another load sensor is disposed to be movable in a left-and-right direction with respect to the other movable rail, the load in a left-and-right direction is difficult to be transmitted by the load sensor moving in a left-and-right direction even when the load in a left-and-right direction is applied to the bridging member, the cushion frame, the movable rails, and the fixed rails. In particular, the bridging member is bent and a load is applied in a direction which the space between a pair of the movable rails gets smaller, that is in a left-and-right direction, by buttocks of a passenger hitting against the bridging member at the time of front collision or the like of a vehicle. However, because the another load sensor is disposed to be movable with respect to the movable rail, the load in a left-and-right direction becomes difficult to be transmitted to the load sensor.

Effect of the Invention

According to the first aspect of the present invention, the submarine phenomenon can be prevented because buttocks of a passenger are held by the bridging member which is provided over between the left mounting unit and the right mounting unit at the position under the seating surface of the cushion. Further, it is difficult for the load such as the right mounting unit and the left mounting unit approaches each other to be transmitted to the load sensor by having the bridging member slide with respect to the at least one mounting unit. Therefore, a fine measurement of a passenger's weight can be obtained even at the time of front collision or the like of the vehicle.

According to the second aspect of the present invention, the submarine phenomenon can be prevented because buttocks of a passenger are held by the bridging member which is provided over between a pair of the movable rails in between a front end and a rear end of the cushion frame. Further, because the cushion frame and the bridging member are separated, the inertia force is difficult to be transmitted to the load sensor even when the inertia force is applied to the bridging member from the buttocks of the passenger at the time of front collision or the like of the vehicle. Therefore, a fine measurement of a passenger's weight can be obtained even at the time of front collision or the like of the vehicle.

BRIEF DESCRIPTION OF THE DRAWINGS

FIG. 2 This is an exploded perspective view showing a vehicle seat 1.
FIG. 3A This is a side view showing an attachment structure of a submarine pipe 11.
FIG. 3B This is a plan view showing an attachment structure of a submarine pipe 11.
FIG. 3C This is a schematic sectional diagram cut along the line III-III of FIG. 3B.

BEST MODE FOR CARRYING OUT THE INVENTION

Figure 1:
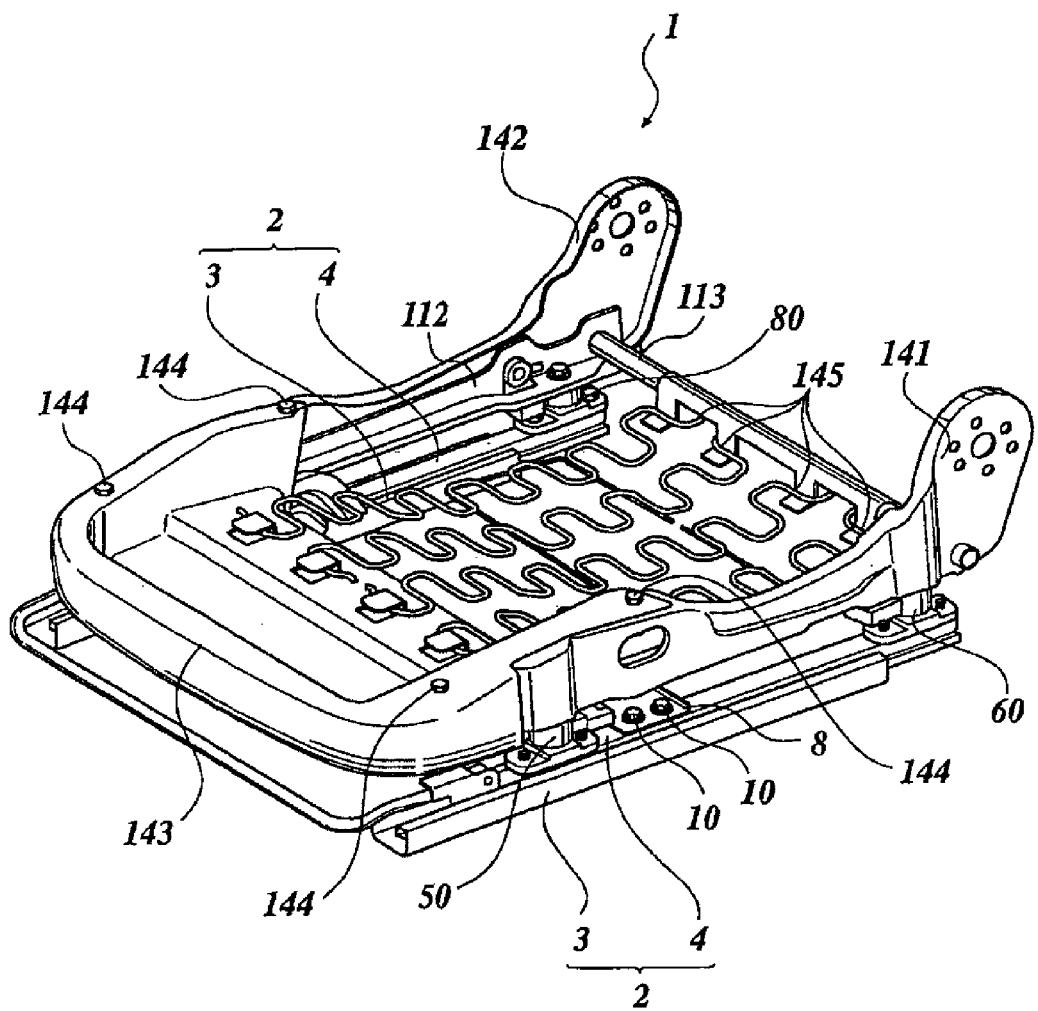
FIG. 1 This is a perspective view showing a vehicle seat 1.

The preferred embodiments of the present invention will be described below with reference to the accompanying drawings. In the embodiments below, various technical preferable limitations are added to carry out the invention. However, the scope of the invention is not limited to the embodiments described below and the examples shown in the drawings.

FIG. 1 is a perspective view showing a vehicle seat 1 which can measure a weight of a passenger who sits on a seat cushion, and FIG. 2 is an exploded perspective view showing a vehicle seat 1. In each of the drawings, arrows indicating up-and-down, left-and-right, and front-and-rear correspond to the directions as seen from a passenger seated on the vehicle seat 1.

The vehicle seat 1 is for the right side seat of the vehicle seat. A buckle for a seatbelt is provided at the left side of the vehicle seat 1 and a tongue plate of the seatbelt is to be fastened by this buckle. A passenger's weight measurement device is provided at the bottom of the seat cushion of the vehicle seat 1. The weight of the passenger who sits on the seat cushion is measured by the passenger's weight measurement device.

As shown in FIGS. 1 and 2, at a bottom of the vehicle seat 1, a pair of left and right seat-sliders 2 parallel to each other are disposed on the floor of the passenger compartment. Both of the seat-sliders 2 comprise a fixed lower rail 3 which is fixed to the floor of the passenger compartment and extends in a front-and-rear direction of the vehicle, and a movable upper rail 4 which is engaged with the fixed lower rail 3 so as to be slidable in a front-and-rear direction on the fixed lower rail 3 with respect to the fixed lower rail 3.

The left end of lower bracket 5 is fixed to a lower surface of the left fixed lower rail 3 by a bolt and nut connection 6, and the right end of lower bracket 5 is fixed to a lower surface of the right fixed lower rail 3 by a bolt and nut connection 7. The bracket 5 is crossed between left and right fixed lower rails 3 to improve the rigidity to suppress the variable of the space between left and right fixed lower rails 3.

A bracket 8 as a left mounting unit is fixed to the middle portion of the left movable upper rail 4 in a front-and-rear direction on an upper surface thereof by a bolt and nut connection 10, and a bracket 9 as a right mounting unit is fixed to the middle portion of the right movable upper rail 4 in a front-and-rear direction on an upper surface thereof. Both brackets 8 and 9 are formed in L-shape when seen from the front and are disposed so as to erect them with respect to the upper surface of each movable upper rail 4. Both brackets 8 and 9 may include an inward-biased portion.

A submarine pipe 11 is crossed between the brackets 8 and 9. Here, brackets 8 and 9 and a submarine pipe 11 will be described in detail with reference to FIGS. 3A to 3C. FIG. 3A is a left side view, FIG. 3B is a top view, and FIG. 3C is a schematic sectional diagram cut along the line III-III of FIG. 3A.

A mounting hole which penetrates in a left-and-right direction is formed on a left bracket 8, and a left end of submarine pipe 11 is inserted into the mounting hole. Further, the bracket 8 and the submarine pipe 11 are fixed by welding. An inward-biased portion 8A may be formed on bracket 8.

A mounting hole which penetrates in a left-and-right direction is also formed on a right bracket 9 and the ring-shaped nylon bush 12 is fitted in the mounting hole. The bush 12 is latched by the bracket 9 along the edge of the mounting hole, and the moving of the bush 12 in the penetration direction of the mounting hole is deterred. The right end of the submarine pipe 11 is inserted into the bush 12, and the submarine pipe 11 can slide in the penetration direction of the mounting hole with respect to the bush 12. Moreover, the sectional area of the submarine pipe 11 at a predetermined distance apart towards the right end of the submarine pipe 11 from the mounting hole of the bracket 9 (here, the area at the right end) is formed to be larger than the area of the mounting hole. Particularly, the submarine pipe 11 is provided in a shape where the opening of the submarine pipe 11 becomes larger as it approaches the right end in the right side of the mounting hole of the bracket 9 (trumpet shape) to prevent the submarine pipe 11 from falling out from the bush 12 and the mounting hole. By providing a flange at the right end of the submarine pipe 11, the sectional area of the submarine pipe 11 including the flange can be made larger than the mounting hole, and the submarine pipe 11 may be prevented from falling out from the bush 12 and the mounting hole by the flange.

In the present embodiment, the submarine pipe 11 is fixed to the left bracket 8 and can slide in a left-and-right direction with respect to the right bracket 9. However, the submarine pipe 11 may slide in a left-and-right direction with respect to the left bracket 8 and may be fixed to the right bracket 9. Further, the submarine pipe 11 may be slidable in a left-and-right direction with respect to both left and right brackets 8 and 9. When making the submarine pipe 11 to be slidable in a left-and-right direction with respect to the left bracket 8, similar to the case of the right bracket 9, the submarine pipe 11 is to be inserted into the mounting hole of the bracket 8 via a bush, and the left end of submarine pipe 11 is to be formed in trumpet shape.

As shown in FIGS. 1 and 2, a load sensor 50 is mounted on the front end of the upper surface of the left movable upper rail 4, and a load sensor 60 is mounted on the rear end of the upper surface of the left movable upper rail 4. The load sensors 50 and 60 detect the load as an electrical signal.

Figure 4:
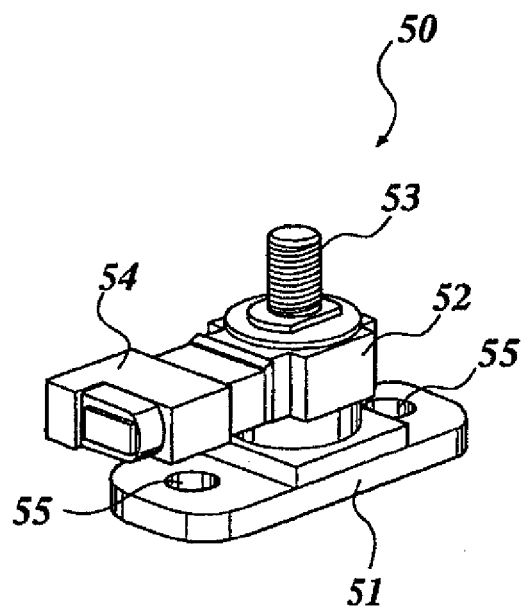
FIG. 4 This is a perspective view showing a left load sensor 50.

The left front load sensor 50 will be described with reference to FIG. 4. FIG. 4 is a perspective view showing the left front load sensor 50. As shown in FIG. 4, the left front load sensor 50 comprises a column-shaped sensing unit 52 which detects the load, a plate-like flange 51 which horizontally extends in a front direction and in a rear direction from the bottom end of the sensing unit 52, a load input rod 53 which extends upward from an upper end of the sensing unit 52, and a connector 54 which extends from the sensing unit 52 to become horizontal with the flange 51. At the front and the rear of the flange 51, male screw shaped circular holes 55 which penetrate in an up-and-down direction are formed respectively, and one of the circular holes 55 is located directly beneath the connector 54. A screw thread is formed on the periphery of the load input rod 53. Moreover, the sensing unit 52 incorporates a strain gauge, and the load is converted to an electrical signal by the strain gauge.

Figure 5:
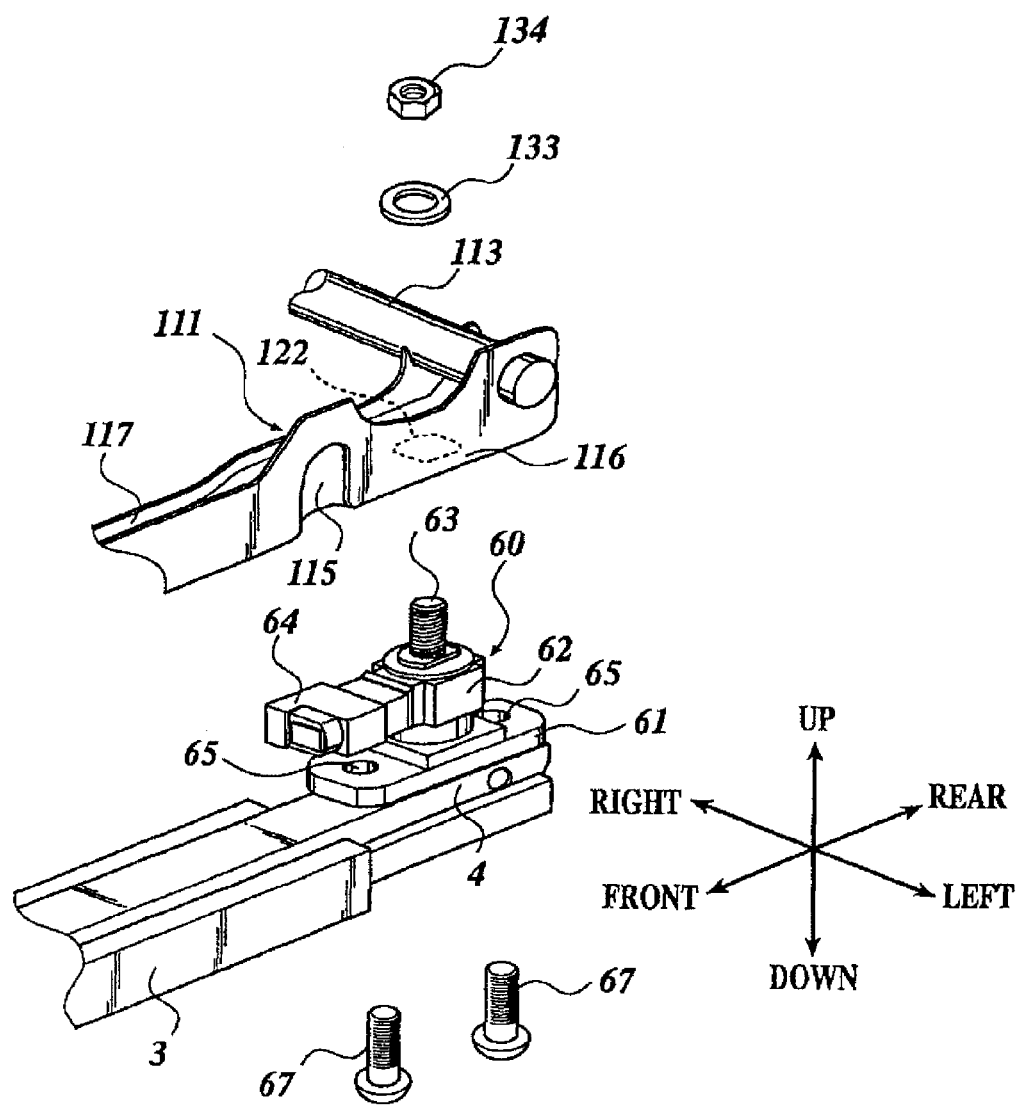
FIG. 5 This is an exploded perspective view showing an attachment structure of a load sensor 60.

FIG. 5 is an exploded perspective view showing a rear end of the left movable upper rail 4. As shown in FIG. 5, similar to the left front load sensor 50, the left rear load sensor 60 comprises a flange 61, a sensing unit 62, a load input rod 63, and a connector 64. References having the same last single digit are assigned to the corresponding parts of the left front load sensor 50 and the left rear load sensor 60, and the description for each part of the left rear load sensor 60 is omitted.

The left rear load sensor 60 is disposed on the rear end of the left movable upper rail 4 as shown in FIG. 5. The lower surface of the flange 61 abuts the upper surface of the left movable upper rail 4, and the male screws 67 and 67 which penetrate the movable upper rail 4 from bottom up engage with the circular holes 65 and 65. By the tightening of the male screws 67 and 67, the movable upper rail 4 is held between the heads of the male screws 67 and 67 and the flange 61. In such way, the load sensor 60 is fixed to the upper surface of the movable upper rail 4. On the other hand, as shown in FIGS. 1 and 2, similar to the case of the load sensor 60, the left front load sensor 50 is fixed to the front upper surface of the movable upper rail 4 by engaging the male screws 57 and 57 which penetrates the movable upper rail 4 from bottom up with the circular holes 55 and 55. Here, the tip of the connector 54 is directed backward for the left front load sensor 50, while the tip of the connector 64 is directed forward for the left rear load sensor 60.

As shown in FIG. 2, a load sensor 70 is mounted on the front end of the upper surface of the right movable upper rail 4, and a load sensor 80 is mounted on the rear end of the upper surface of the right movable upper rail 4. The load sensors 70 and 80 are provided to detect the load as an electrical signal.

Figure 6:
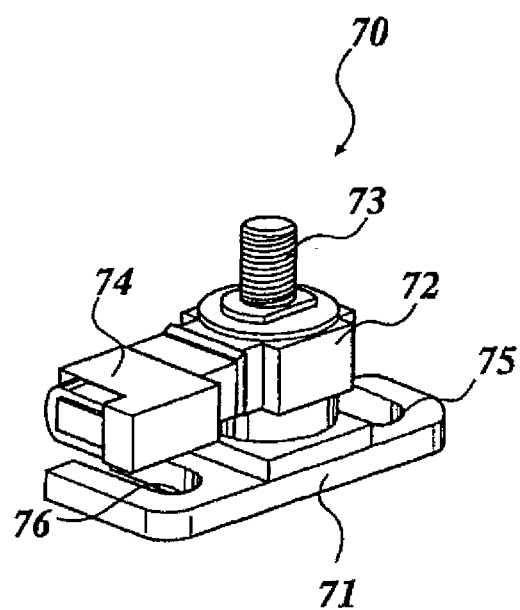
FIG. 6 This is a perspective view showing a right load sensor 70.

The right front load sensor 70 will be described with reference to FIG. 6. FIG. 6 is the perspective view showing the right front load sensor 70. As shown in FIG. 6, the right front load sensor 70 comprises a column-shaped sensing unit 72 which detects the load, a plate-like flange 71 which horizontally extends in the front direction and in the rear direction from the bottom end of the sensing unit 72, a load input rod 73 which extends upward from the upper end of the sensing unit 72, and a connector 74 which extends from the sensing unit 72 to become horizontal with the flange 71. An elongated hole 75 which penetrates the flange 71 in an up-and-down direction and has a left-and-right direction as the longitudinal direction is formed on either front part or back part of the flange 71, and a notch 76 which has an opening at the edge along the longitudinal direction of the flange 71 and has a left-and-right direction as the longitudinal direction is formed on the other part. The notch 76 is formed on the flange 71 directly beneath the connector 74. A screw thread is formed on the periphery of the load input rod 73. Moreover, the sensing unit 72 incorporates a strain gauge, and the load is converted to an electrical signal by the strain gauge.

Figure 7:
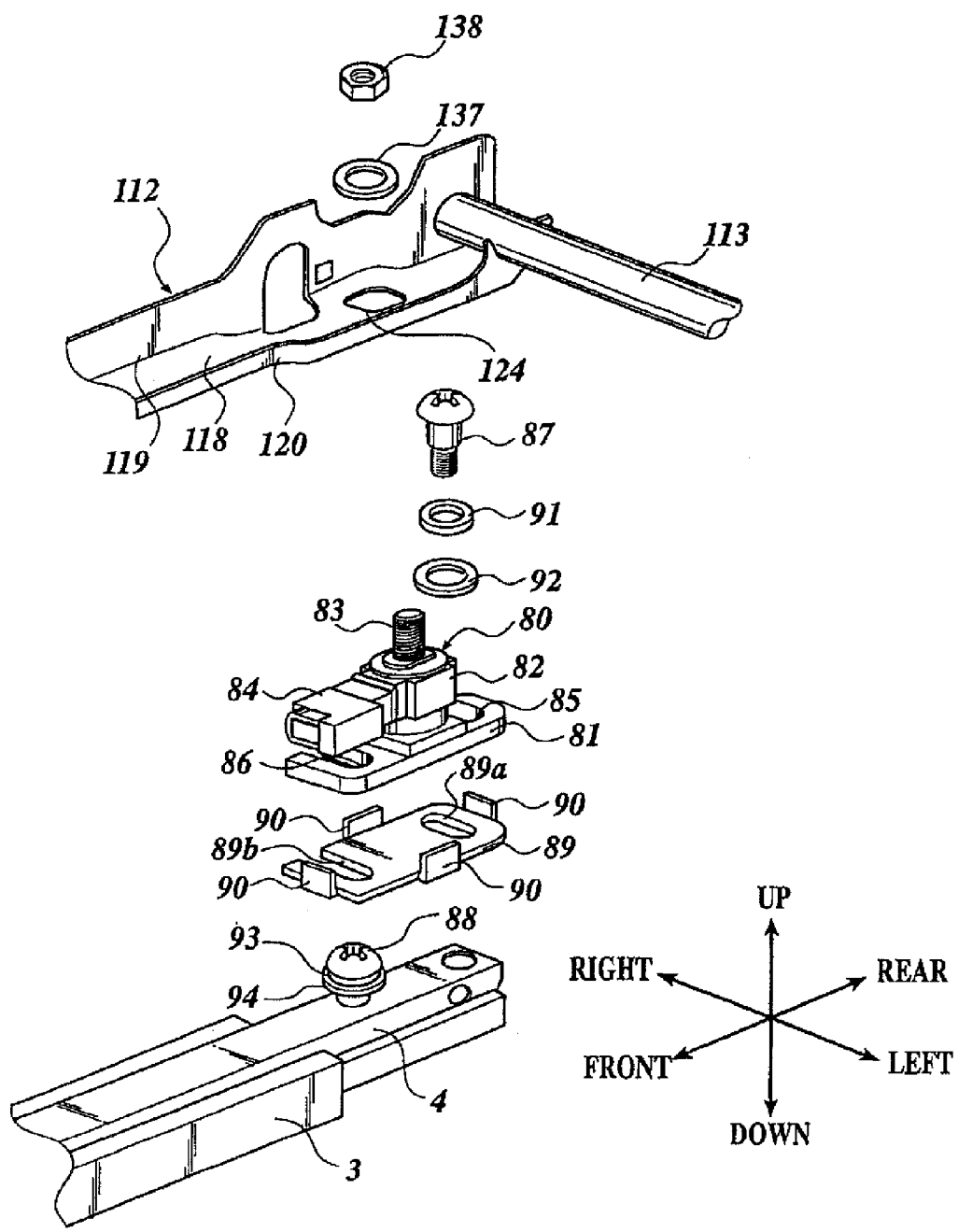
FIG. 7 This is an exploded perspective view showing an attachment structure of a load sensor 80.

FIG. 7 is an exploded perspective view showing a rear end of the movable upper rail 4. The right rear load sensor 80, similarly to the right front load sensor 70, comprises a flange 81, a sensing unit 82, a load input rod 83, and a connector 84. References having the same last single digit are assigned to the corresponding parts of the right front load sensor 70 and the right rear load sensor 80, and the description of each part of the right rear load sensor 80 is omitted.

The right rear load sensor 80 is disposed on the rear end of the right movable upper rail 4 as shown in FIG. 7. A slide plate 89 having approximately the same shape as the planar shape of the flange 81 abuts the lower surface of the flange 81, and the flange 81 is grasped by four pawls 90 formed at the edge of the slide plate 89. On the slide plate 89, an elongated hole 89a which penetrates in an up-and-down direction and has a left-and-right direction as the longitudinal direction is formed. Further, a notch 89h which has an opening at the edge along the longitudinal direction of the slide plate 89 and has a left-and-right direction as the longitudinal direction is formed on the slide plate 89. The elongated hole 89a corresponds to the elongated hole 85 of the load sensor 80, and the notch 89b corresponds to the notch 86 of the load sensor 80.

The flange 81 is disposed on the upper surface of the movable upper rail 4 in a state where the slide plate 89 abuts the upper surface of the right movable upper rail 4. Further, the level screw 87 which is inserted into the ring-shaped damper 91 and the slide member 92 is inserted into the elongated hole 85 from above as a slider, and the level screw 87 is disposed so as to erect it with respect to the upper surface of the movable upper rail 4 by engaging the level screw 87 with the movable upper rail 4. The slide plate 89, the flange 81, the slide member 92, and the damper 91 are held between the head of the level screw 87 and the movable upper rail 4, and the level screw 87 can slide in the longitudinal direction of the elongated hole 85.

Further, the level screw 88 which is inserted into the ring-shaped damper 93 and the slide member 94 is engaged with the movable upper rail 4 so as to erect it on the upper surface of the movable upper rail 4, and the level screw 88 is inserted into the notch 86 as the slider. The slide plate 89, the flange 81, the slide member 94, and the damper 93 are held between the head of the level screw 88 and the movable upper rail 4, and the level screw 88 can slide in the longitudinal direction of the notch 86. In such way, the level screw 87 slides in the longitudinal direction of the elongated hole 85, and the level screw 88 slides in the longitudinal direction of the notch 86. Therefore, the right rear load sensor 80 can slide in a left-and-right direction with respect to the right movable upper rail 4 in the range between the point where the level screw 87 abuts the right end of the elongated hole 85 and the point where the level screw 87 abuts the left end of the elongated hole 85.

The mounting instruction for the right rear load sensor 80 is as described below. First, the level screw 88 is inserted into the damper 93 and the slide member 94, in this order, and the level screw 88 is engaged with the movable upper rail 4 so as to erect it on the upper surface of the movable upper rail 4. However, the head of the level screw 88 is to be apart from the upper surface of the movable upper rail 4. Next, the slide plate 89 is fitted to the flange 81 of the right rear load sensor 80, and the flange 81 is grasped by the pawls 90 of the slide plate 89. Then, the level screw 88 is inserted into the damper 91 and the slide member 92, in this order. Further, the level screw 87 is inserted into the elongated hole 85 and the level screw 87 is engaged with the movable upper rail 4. At this state, the level screw 88 is not in the notch 86. Next, by rotating the right rear load sensor 80 centering the level screw 87, the level screw 88 is inserted into the opening of the notch 86 at the edge of the flange 81 and the level screw 88 is latched by the notch 86. In such way, because the notch 86 is located directly beneath the connector 84, the connector 84 becomes an obstacle and the level screw 88 cannot be inserted into the notch 86 from above to be engaged with the movable upper rail 4. However, because the level screw 88 is engaged with the movable upper rail 4 beforehand and the notch 86 has an opening at the edge of the flange 81, the level screw 88 can be inserted into the notch 86 by the rotation of the load sensor 80. Moreover, because the flange 81 is held between the head of the level screw 88 and the movable upper rail 4, the load sensor 80 does not depart upward easily. In addition, because the flange 81 of the load sensor 80 is grasped by the pawls 90, the slide plate 89 does not slide with respect to the flange 81 when the load sensor 80 rotates.

The lower surface of the slide plate 89 is coated by a resin or the like so that the slide plate 89 is easily slid with respect to the movable upper rail 4. Instead of providing the coated slide plate 89, the flange 81 can be made to be easily slid with respect to the movable upper rail 4 by coating the lower surface of the flange 81 with a resin or the like.

As shown in FIG. 2, the right front load sensor 70 is mounted on the upper surface of the movable upper rail 4 in a similar way as the load sensor 80. The mounting instruction for the right front load sensor 70 is the same as the case of the right rear load sensor 80. That is, the slide plate 79 disposed in a same way as the slide plate 89 is grasped by the pawls to the lower surface of the flange 71, and the level screw 77 which is inserted into the damper 101 and the slide member 102 comes through the elongated hole 75 from above to be engaged with the movable upper rail 4 so as to erect it on the upper surface of the movable upper rail 4. The level screw 78 which is inserted into the damper 103 and the slide member 104 engages with the movable upper rail 4 so as to erect it on the upper surface on the movable upper rail 4, and the level screw 78 is inserted into the notch 76 by the rotation of the right front load sensor 70. Because the level screw 77 can slide in the longitudinal direction of the elongated hole 75 and the level screw 78 can slide in the longitudinal direction of the notch 76, the load sensor 70 can slide in a left-and-right direction with respect to the right movable upper rail 4 in the range between the point where the level screw 77 abuts the right end of the elongated hole 75 and the point where the level screw 77 abuts the left end of the elongated hole 75. Here, the tip of the connector 74 is directed backward for the right front load sensor 70, while the tip of the connector 84 is directed forward for the right rear load sensor 80.

As shown in FIG. 2, the sub frame 110 having a shape of a rectangular frame is mounted and fixed on the four load sensors 50, 60, 70, and 80. The sub frame 110 comprises a left patch member 111 which extends in a front-and-rear direction, a right patch member 112 which extends in a front-and-rear direction to become parallel with the patch member 111, a cross pipe 113 which crosses over between the rear ends of the patch members 111 and 112, and a front member 114 which crosses over between the front ends of the patch members 111 and 112.

The patch member 111 is a metal material having a web 115 and left and right flanges 116 and 117, and is U-shaped in section. The length of the web 115 in a front-and-rear direction is longer than the length of the flanges 116 and 117 in a front-and-rear direction, the front end of the web 115 projects more in front than the front ends of the flanges 116 and 117, and the webs 115 and 116 are not provided at left and right of the front end of the web 115. The right patch member 112 is also a metal material having the web 118 and left and right flanges 119 and 120, and is U-shaped in section, and the webs 119 and 120 are not provided at left and right of the front end of the web 118. The mounting hole 121 is formed at the front end of the web 115 of the left patch member 111 to penetrate in an up-and-down direction, and the mounting hole 122 is formed at the rear end of the web 115 to penetrate in an up-and-down direction. The mounting hole 123 is formed at the front end of the web 118 of the right patch member 112 to penetrate in an up-and-down direction, and the mounting hole 124 is formed at the rear end of the web 118 to penetrate in an up-and-down direction.

The front member 114 is a metal material having the web and front and rear flanges, and is U-shaped in section. The left end of the front member 114 is welded to the upper surface of the projected front end of the web 115, and the right end of the front member 114 is welded to the upper surface of the projected front end of the web 116. A harness which is connected to the connectors 54, 64, 74, and 84 of the load sensors 50, 60, 70, and 80 is applied to the front member 114 by clips.

The mounting hole is formed to penetrate in a left-and-right direction at the rear end of the flange 116 of the left patch member 111, the cross pipe 113 is inserted into this mounting hole, and further, the cross pipe 113 and the flange 116 are fixed by welding. The mounting hole which penetrates in a left-and-right direction is also formed at the rear end of the flange 119 of the right patch member 112, the cross pipe 113 is inserted in this mounting hole, and the cross pipe 113 and the flange 119 are fixed by welding.

The sub frame 110 which is assembled as described above is disposed to the load sensor 50, 60, 70, and 80 as described below. The load input rod 53 of the left front load sensor 50 is inserted into the mounting hole 121 of the left patch member 111 from bottom up, and the front end of the left patch member 111 is mounted on the sensing unit 52. Then, the washer 131 is provided around the load input rod 53 as a ring, the nut 132 engages with the load input rod 53, the washer 131 and the web 115 are held between the nut 132 and the upper surface of the sensing unit 52, and the load input rod 53 is fixed to the front end of the left patch member 111 by the tightening of the nut 132. Similarly, the load input rod 73 is inserted into the mounting hole 123 and the washer 135 from bottom, and the rear end of the right patch member 112 is mounted on the sensing unit 72. The load input rod 73 is fixed to the front end of the right patch member 112 by the tightening of the nut 136 which is engaged with the load input rod 73.

Similarly for the rear load sensors 60 and 80, by the tightening of the nuts 134 and 138 which are engaged with the load input rods 63 and 83 that are inserted into the mounting holes 122 and 124 and the washer 133 and 137 from bottom, the load input rods 63 and 83 are fixed to the rear end of the patch members 111 and 112.

Here, because the right load sensors 70 and 80 are disposed to be slidable in a left-and-right direction with respect to the right movable upper rail 4, each of the mounting holes 121 to 124 can be fitted to the load input rods 53, 63, 73, and 83, respectively, with minor adjustments of the load sensors 70 and 80 in a left-and-right direction. Therefore, when the sub frame 110 is disposed, the initial deformation of the sub frame 110 and the like can be prevented, and the initial load to the load sensor 50, 60, 70, and 80 can be eliminated.

The sub frame 110 is assembled by welding in advance before disposing to the load sensor 50, 60, 70, and 80. However, when the sub frame 110 is assembled, the patch member 111, the patch member 112, the cross pipe 113, and the front member 114 are fixed by the jig so that each of the mounting holes 121 to 124 can fit to the load input rods 53, 63, 73, and 83, respectively. Therefore, each of the load input rods 53, 63, 73, and 83 can be fit to and inserted into the mounting holes 121 to 124, respectively, without deforming the pre-assembled sub frame 110.

In a state where the sub frame 110 is disposed on the load sensors 50, 60, 70, and 80, when seen from above as a plan view, the submarine pipe 11 is positioned more in rear than the front member 11 and more in the front than cross pipe 113.

As shown in FIG. 1, the side frame 141 is welded to the flange 116 outside of the patch member 111, and the side frame 142 is welded to the flange 119 outside of the patch member 112. The side frames 141 and 142 are parts of the seat cushion frame, and particularly, constitute the sides of the seat cushion frame. Further, the sub frame 110 reinforces the side frames 142 and 142 as a part of the frame of the seat cushion. Before disposing the sub frame 110 on the load sensors 50, 60, 70, and 80, the side frames 141 and 142 are disposed to the sub frame 110 by welding.

The front of the side frames 141 and 142 are covered with the pan frame 143 from the above, and the pan frame 143 is tightened with respect to the side frames 141 and 142 by the bolt 144 as a male screw. Further, the pan frame 143 can be dismounted by loosening and removing the bolt 144. Here, the pan frame 143 is a part of the seat cushion, and particularly, constitutes the front of the seat cushion frame. The pan frame 143 may be tightened to the side frames 141 and 142 by other male screws instead of the bolt 144. The pan frame 143 may be fixed to the side frames 141 and 142 by latching the locking unit formed on the pan frame 143 with the locking unit formed on the side frames 141 and 142, and the pan frame 143 may be detached from the side frames 141 and 142 by elastically deforming both of the locking units.

The seat spring 145 is crossed over between the cross pipe 113 and the pan frame 143. A cushion is mounted on the pan frame 143 and the seat spring 145. The cushion, the pan frame 143, and the side frames 141 and 142 are covered with a cover entirely. A surface of the cover becomes the seating face. Therefore, left and right brackets 8 and 9, a submarine pipe 11, and load sensors 50, 60, 70, and 80 are disposed under the seating face.

A backrest frame is connected to a rear end of side frames 141 and 142. The backrest frame is disposed to be rotatable in front-and-rear centering the connection unit where connects with the side frames 141 and 142. To make the drawing easier to be seen, the backrest frame is omitted from the drawing.

In the vehicle seat 1 configured as described above, when a passenger sits on the seat cushion, the weight (body weight) of the passenger is applied to the load sensors 50, 60, 70, and 80 through the sub frame 110, and the weight of the passenger is converted to an electrical signal by the load sensor 50, 60, 70, and 80.

Here, each one of the load sensors 50, 60, 70, and 80 is disposed between the movable upper rail 4 and the side frames 141 and 142, so as to attach one sensor in the front and one sensor in the rear. The load sensors 50, 60, 70, and 80 are configured to move in a front-and-rear direction as a unit with the seat cushion. Therefore, despite the position of the seat cushion in a front-and-rear direction, the load (weight of a passenger) transmitted to the load sensors 50, 60, 70, and 80 from the seat cushion can be consistently kept constant. Thus, the accuracy of the passenger's weight measurement can improve.

Further, the right load sensors 70 and 80 can slide in a left-and-right direction with respect to the movable upper rail 4. Therefore, even when the load is applied in a left-and-right direction with respect to the sub frame 110 and the like, the load escapes due to the sliding of the load sensors 70 and 80 and the load in a left-and-right direction is not applied to the load sensors 50, 60, 70, and 80. Thus, the accuracy of the passenger's weight measurement can be improved.

While the right load sensors 70 and 80 can slide with respect to the right movable upper rail 4, the left load sensors 50 and 60 are fixed to the left movable upper rail 4. Therefore, the seat cushion does not sway in a left-and-right direction and the minimum rigidity as a vehicle seat is assured.

Moreover, the submarine pipe 11 is crossed between the movable upper rails 4 and 4 via the brackets 8 and 9 in between the front member 114 and the cross pipe 113. Therefore, when a frontward inertia force is applied to the passenger due to a front collision or the like of the vehicle, the buttocks of the passenger seated on the vehicle seat are held by the submarine pipe 11. Thus, so-called submarine phenomenon where the passenger gets under the waist belt can be prevented.

Further, because a submarine pipe 11 is provided separately from a sub frame 110, the forward inertia force is not transmitted to the load sensors 50, 60, 70, and 80 through the sub frame 110 even when buttocks of a passenger hit against the submarine pipe 11 at the time of front collision or the like of the vehicle. Therefore, the accuracy of the passenger's weight measurement can be improved even at the time of front collision or the like of the vehicle.

Moreover, because the buttocks of the passenger are held by the submarine pipe 11 at the time of front collision or the like of the vehicle, there is a case where the submarine pipe bends forward in convex. Here, because the right end of the submarine pipe 11 can move in a left-and-right direction with respect to the bracket 9 and is not fixed to the bracket 9, the load is not transmitted to the load sensors 50, 60, 70, and 80 even when the forward load is applied to the submarine pipe 11. Thus, the accuracy of the passenger's weight measurement can be improved even at the time of front collision or the like of the vehicle.

Further, because the sub frame 110 is assembled beforehand, each of the load input rods 53, 63, 73, and 83 can be matched and inserted into the mounting holes 121 to 124, respectively, without deforming the assembled sub frame 110. Therefore, application of the initial load to the load sensors 50, 60, 70, and 80 can be prevented when the load is not applied to the sub frame 110. Thus, the accuracy of the passenger's weight measurement can be improved.

Further, only the webs 115 and 118 are provided at the front end of the patch members 111 and 112, and the flanges 116, 117, 119, and 120 are not provided there. Therefore, because the patch members 111 and 112 are deformed at the front end of the webs 115 and 118 thereof when a large load is applied to the sub frames 110 at the time of front collision or the like of the vehicle, the load is alleviated at the deformed portion. Therefore, a large load is not transmitted to the load sensors 50, 60, 70, and 80 even when a large load is applied to the sub frame 110. Thus, the accuracy of the passenger's weight measurement can be improved and the damage to the load sensors 50, 60, 70, and 80 can be suppressed even at the time of front collision or the like of the vehicle.

In addition, because the top of the front load sensors 50 and 70 are opened when the pan frame 143 is dismounted, the maintenance of the load sensors 50 and 70 can be done.

Further, the present invention is not limited to the embodiment described above. Various improvements and design changes can be made without departing from the gist of the invention.

Modification Example 1

In the above described embodiment, the right load sensors 70 and 80 are disposed to be slidable in a left-and-right direction with respect to the movable upper rail 4. However, the right load sensor 70 and 80 may further be disposed to be slidable in a left-and-right direction with respect to the patch member 112. Moreover, the load sensors 70 and 80 may be fixed to the movable upper rail 4 and may be disposed to be slidable in a left-and-right direction with respect to the patch member 112. Here, in order to dispose the load sensors 70 and 80 to be slidable in a left-and-right direction with respect to the patch member 112, the mounting holes 123 and 124 are formed as elongated holes lengthened in a left-and-right direction, the load input rods 73 and 83 are inserted into the ring-shaped slide member, and the slide member is held between the washers 135 and 137 and the web 118. In addition, in order to fix the load sensors 70 and 80 to the movable upper rail 4, the load sensors 70 and 80 are fixed to the movable upper rail 4 in a similar way as the left load sensors 50 and 60.

Modification Example 2

In the above described embodiment, the vehicle seat 1 is a right vehicle seat. However, the left vehicle seat is structured in symmetrical with respect to the vehicle seat 1 described in the above embodiment. That is, the left vehicle seat, the load sensors 70 and 80 which can slide in a left-and-right direction are on the left side and the fixed load sensors 50 and 60 are on the right side.

Modification Example 3

In the above described embodiment, the flanges 71 and 81 of the load sensors 70 and 80 horizontally extend in a front-and-rear direction. However, the flanges 71 and 81 of the load sensor 70 and 80 may horizontally extend in a left-and-right direction. The longitudinal direction of the elongated holes 75 and 85 and the notches 76 and 86 formed on the flanges 71 and 81 is the left-and-right direction even when the flanges 71 and 81 extend in a left-and-right direction. The width of the movable upper rail 4 in a left-and-right direction can be narrower when the flanges 71 and 81 extend in a front-and-rear direction, as described in the above embodiment, as compared with the case where the flanges 71 and 81 extend in a left-and-right direction.

Modification Example 4

In the above described embodiment, a bracket 8 is a left mounting unit and a bracket 9 is a right mounting unit. However, a left patch member 111 may be a left mounting unit and a right patch member 112 may be a right mounting unit. In this case, a mounting hole on the flange 116 of the left patch member 111 penetrates in a left-and-right direction, and a mounting hole on the flange 119 of the right patch member 112 penetrates in a left-and-right direction. The submarine pipe is crossed between flanges 116 and 119 by inserting the submarine pipe into the mounting holes. Here, similar to the configuration shown in FIG. 3(c), a submarine pipe is disposed to be slidable in left-and-right direction with respect to both of the mounting holes or a submarine pipe is disposed to be slidable in a left-and-right direction with respect to one of the mounting holes and is fixed to the other mounting hole by welding. Preferably, the mounting holes on the flanges 116 and 119 are formed between a cross pipe 113 and a front member 114.

Modification Example 5

In the above described embodiment, a bracket 8 is a left mounting unit and a bracket 9 is a right mounting unit. However, a left side frame 141 may be a left mounting unit and a right side frame 142 may be a right mounting unit. In this case, a mounting hole on the left side frame 141 penetrates in a left-and-right direction, and a mounting hole on the right side frame 142 penetrates in a left-and-right direction. The submarine pipe is crossed between side frames 141 and 142 by inserting the submarine pipe into the mounting holes. Here, similar to the configuration shown in FIG. 3(*c*), a submarine pipe is disposed to be slidable in a left-and-right direction with respect to both of the mounting holes or a submarine pipe is disposed to be slidable in a left-and-right direction with respect to one of the mounting holes and is fixed to the other mounting hole by welding.

INDUSTRIAL APPLICABILITY

The passenger's weight measurement device can be applied widely to, for example, car, train, and other vehicle seats.

The invention claimed is:

1. A vehicle seat, comprising:
 a load sensor to measure a load of a passenger, the load sensor being disposed at a seat cushion frame;
 left and right fixed rail members that are attachable to a vehicle;
 left and right movable rail members that are movable with respect to the left and right fixed rail members;
 left and right side frame members that are disposed above the left and right movable rail members; and
 a submarine inhibition member that is disposed substantially between the left and right movable rail members, wherein
  the submarine inhibition member is disposed more upward than the left and right movable rail members,
  the load sensor is disposed at at least one of the left and right movable rail members,
  a main body of the load sensor is disposed between at least one of the left and right side frame members and the at least one of the left and right movable rail members,
  the load sensor is disposed near at least one end section of the submarine inhibition member, and
  the load sensor comprises a connector that extends from the main body of the load sensor in a substantially rearward direction along the at least one of the left and right moveable rail members.

2. The vehicle seat as claimed in claim 1, wherein
 at least one end section of the submarine inhibition member at the load sensor side is formed of a pipe member, and
 an end section of the pipe member is connected to the at least one of the left and right moveable rail members via at least one other member.

3. The vehicle seat as claimed in claim 1, wherein the connector is disposed between the at least one of the left and right side frame members and the at least one of the left and right movable rail members.

4. The vehicle seat as claimed in claim 1, wherein the at least one of the left and right side frame members, the load sensor and the connector are disposed on a same vertical plane that passes through a front section and a rear section of the at least one of the left and right movable rail members.

5. The vehicle seat as claimed in claim 1, wherein
 inside extending flange sections are present in the left and right side frame members, and
 the load sensor and the connector are disposed below at least one of the inside facing flange sections.

6. The vehicle seat as claimed in claim 5, wherein the at least one of the inside extending flange sections, the load sensor and the connector are disposed on a same vertical plane that passes through a front section and a back section of the at least one of the left and right movable rail members.

7. The vehicle seat as claimed in claim 1, wherein the submarine inhibition member and at least part of the load sensor are disposed on a same vertical plane that is orthogonal to the at least one of the left and right movable rail members.

8. The vehicle seat as claimed in claim 1, wherein
 at least a part of the submarine inhibition member is formed of a pipe member that extends in a substantially right-left direction, and
 an end of the connector is disposed more rearward than a front end of an end section of the pipe member.

9. The vehicle seat as claimed in claim 1, wherein the submarine inhibition member is disposed more rearward than a front end of a fastening member that fastens the load sensor to the at least one of the left and right movable rail members.

10. The vehicle seat as claimed in claim 1, wherein
 at least a part of the submarine inhibition member is formed of a pipe member that extends in a substantially right-left direction,
 an end of the connector is disposed more rearward than an axis of an end section of the pipe member, and
 a front end of a fastening member that fastens the load sensor to the at least one of the left and right movable rail members is disposed more frontward than the axis of the pipe member.

11. A vehicle seat, comprising:
 a load sensor to measure a load of a passenger, the load sensor being disposed at a seat cushion frame;
 left and right fixed rails that are attachable to a vehicle;
 left and right movable members that are movable with respect to the left and right fixed rails; and
 a submarine inhibition member that is disposed substantially between the left and right movable members, wherein
  the left and right movable members comprise: i) left and right movable rails disposed on the left and right fixed rails, and ii) left and right side frame members disposed above the left and right movable rails,
  the submarine inhibition member is connected to the left and right movable members and is disposed more upward than the left and right movable rails,
  the load sensor is disposed at at least one of the left and right movable rails,
  a main body of the load sensor is disposed between at least one of the left and right side frame members and the at least one of the left and right movable rails,
  the load sensor is disposed near at least one end section of the submarine inhibition member, and
  the load sensor comprises a connector that extends from the main body of the load sensor in a substantially rearward direction along the at least one of the left and right movable rails.

12. The vehicle seat as claimed in claim 11, wherein the connector is disposed between the at least one of the left and right side frame members and the at least one of the left and right movable rails.

13. The vehicle seat as claimed in claim 11, wherein the at least one of the left and right side frame members, the load sensor and the connector are disposed on a same vertical plane that passes through a front section and a rear section of the at least one of the left and right movable rails.

14. The vehicle seat as claimed in claim 11, wherein
inside extending flange sections are present in the left and right side frame members, and
the load sensor and the connector are disposed below at least one of the inside extending flange sections.

15. The vehicle seat as claimed in claim 14, wherein the inside extending flange section, the load sensor and the connector are disposed on a same vertical plane that passes through a front section and a back section of the at least one of the left and right movable rails.

16. The vehicle seat as claimed in claim 11, wherein the submarine inhibition member and at least part of the load sensor are disposed on a same vertical plane that is orthogonal to the at least one of the left and right movable rails.

17. The vehicle seat as claimed in claim 11, wherein
at least a part of the submarine inhibition member is formed of a pipe member that extends in a substantially right-left direction, and
an end of the connector is disposed more rearward than a front end of an end section of the pipe member.

18. The vehicle seat as claimed in claim 11, wherein the submarine inhibition member is disposed more rearward than a front end of a fastening member that fastens the load sensor to the at least one of the left and right movable rails.

19. The vehicle seat as claimed in claim 11, wherein
at least a part of the submarine inhibition member is formed of a pipe member that extends in a substantially right-left direction,
an end of the connector is disposed more rearward than an axis of an end section of the pipe member, and
a front end of a fastening member that fastens the load sensor to the at least one of the left and right movable rails is disposed more frontward than the axis of the pipe member.

20. The vehicle seat as claimed in claim 11, wherein
at least one end section of the submarine inhibition member at the load sensor side is formed of a pipe member, and
an end section of the pipe member is connected to the at least one of the left and right moveable rails through at least a bracket member.

21. A vehicle seat, comprising:
a load sensor to measure a load of a passenger, the load sensor being disposed at a seat cushion frame;
left and right fixed rails that are attachable to a vehicle;
left and right movable members that are movable with respect to the left and right fixed rails; and
a submarine inhibition member that is disposed substantially between the left and right movable members, wherein
the left and right movable members comprise: i) left and right movable rails that are disposed on the left and right fixed rails, and ii) left and right side frame members that are disposed above the left and right movable rails,
the submarine inhibition member is connected to the left and right movable members and is disposed more upward than the left and right movable rails,
the load sensor is disposed at at least one of the left and right movable rails,
a main body of the load sensor is disposed between a front section of at least one of the left and right side frame members and a front section of the at least one of the left and right movable rails,
the load sensor comprises a connector that extends from the main body of the load sensor in a substantially rearward direction along the at least one of the left and right movable rails,
at least a part of the submarine inhibition member is formed of a pipe member that extends in a substantially right-left direction,
an end of the connector is disposed more rearward than a front end of an end section of the pipe member, and
the end section of the pipe member at the load sensor side and at least part of the load sensor are disposed on a same vertical plane that is orthogonal to the at least one of the left and right movable rails.

22. The vehicle seat as claimed in claim 21, wherein
the connector is disposed between the at least one of the left and right side frame members and the at least one of the left and right movable rails, and
the at least one of the left and right side frame members, the load sensor and the connector are disposed on a same vertical plane that passes through a front section and a rear section of the at least one of the left and right movable rails.

23. The vehicle seat as claimed in claim 21, wherein
inside extending flange sections are present in the left and right side frame members,
the main body of the load sensor and the connector are disposed below at least one of the inside extending flange sections, and
the at least one of the inside extending flange sections, the load sensor and the connector are disposed on a same vertical plane that passes through a front section and a back section of the at least one of the left and right movable rails.

24. The vehicle seat as claimed in claim 21, wherein
the end of the connector is disposed more rearward than an axis of an end section of the pipe member, and
a front end of a fastening member that fastens the load sensor to the at least one of the left and right movable rails is disposed more frontward than the axis of the pipe member.

25. The vehicle seat as claimed in claim 1, wherein
at least a part of the submarine inhibition member is formed of a pipe member which extends in a substantially right-left direction, and
an axis of the pipe member is disposed more rearward than an axis of a rod section of the load sensor.

26. The vehicle seat as claimed in claim 11, wherein
at least a part of the submarine inhibition member is formed of a pipe member that extends in a substantially right-left direction, and
an axis of the pipe member is disposed more rearward than an axis of a rod section of the load sensor.

27. The vehicle seat as claimed in claim 21, wherein an axis of the pipe member is disposed more rearward than an axis of a rod section of the load sensor.

28. The vehicle seat as claimed in claim 1, wherein
a second load sensor is disposed more rearward than the load sensor, and
a connector of the second load sensor extends from a main body of the second load sensor in a substantially frontward direction.

29. The vehicle seat as claimed in claim 11, wherein
a main body of a rear side load sensor is disposed between a rear section of the at least one of the left and right side frame members and a rear section of the at least one of the left and right movable rails, and
a connector of the rear side load sensor extends from the main body of the rear side load sensor in a substantially frontward direction.

30. The vehicle seat as claimed in claim 21, wherein
a second load sensor is disposed more rearward than the load sensor, and
a connector of the second load sensor extends from a main body of the second load sensor in a substantially frontward direction.

* * * * *